United States Patent
Takao (10) Patent No.: US 8,339,776 B2
(45) Date of Patent: Dec. 25, 2012

(54) DISPLAY DEVICE AND ELECTRONIC DEVICE

(75) Inventor: Mitsuyoshi Takao, Hidaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 15 days.

(21) Appl. No.: 13/162,277

(22) Filed: Jun. 16, 2011

(65) Prior Publication Data

US 2012/0106093 A1    May 3, 2012

(30) Foreign Application Priority Data

Oct. 29, 2010  (JP) .................................. 2010-244530

(51) Int. Cl.
G06F 1/16    (2006.01)

(52) U.S. Cl. .................................................. 361/679.21

(58) Field of Classification Search .............. 361/679.21
See application file for complete search history.

(56) References Cited

U.S. PATENT DOCUMENTS

| 5,335,142 A * | 8/1994 | Anderson ................. 361/679.07 |
| 5,569,895 A * | 10/1996 | Lynch et al. .................. 235/1 R |
| 5,923,528 A * | 7/1999 | Lee ........................... 361/679.07 |
| 6,595,481 B1 * | 7/2003 | Huang et al. ............... 248/349.1 |
| 6,801,426 B2 * | 10/2004 | Ichimura .................. 361/679.06 |
| 6,883,206 B2 * | 4/2005 | Yang et al. ........................ 16/337 |
| 7,014,154 B2 * | 3/2006 | Jeong et al. ..................... 248/157 |
| 7,123,472 B2 * | 10/2006 | Huang et al. ............. 361/679.09 |
| 7,168,665 B2 * | 1/2007 | Hong et al. ................. 248/125.1 |
| 7,576,974 B2 * | 8/2009 | Liu et al. .................. 361/679.07 |
| 7,628,375 B2 * | 12/2009 | Jung et al. ...................... 248/676 |
| 7,663,874 B2 * | 2/2010 | Hattori et al. ............. 361/679.4 |
| 7,762,513 B2 * | 7/2010 | Sawai et al. ................ 248/349.1 |
| 7,764,491 B2 * | 7/2010 | Zhao et al. ............... 361/679.22 |
| 7,817,410 B2 * | 10/2010 | Sawai ........................ 361/679.22 |
| 7,950,610 B2 * | 5/2011 | Sawai ............................. 248/131 |
| 8,237,874 B2 * | 8/2012 | Yokota et al. ................. 348/827 |
| 2003/0184193 A1 * | 10/2003 | Lee et al. .................... 312/223.2 |
| 2007/0109734 A1 * | 5/2007 | Chen et al. ..................... 361/681 |
| 2007/0210223 A1 * | 9/2007 | Lee et al. .................... 248/178.1 |
| 2007/0215762 A1 * | 9/2007 | Lee et al. .................... 248/125.7 |
| 2011/0149181 A1 * | 6/2011 | Kim et al. ...................... 348/836 |

FOREIGN PATENT DOCUMENTS

| JP | 03-24589 | 2/1991 |
| JP | 8-261392 | 10/1996 |
| JP | 2004-150515 | 5/2004 |
| JP | 2005-101385 | 4/2005 |
| JP | 2007-251717 | 9/2007 |
| JP | 2007-303496 | 11/2007 |
| JP | 2009-224952 | 10/2009 |

OTHER PUBLICATIONS

Japanese Patent Application No. 2010-244530; Notice of Rejection; Mailed Sep. 6, 2011 (with English translation).
Japanese Patent Application No. 2010-244530; Notice of Rejection; Mailed Dec. 13, 2011 (with English translation).

\* cited by examiner

*Primary Examiner* — Lisa Lea Edmonds
(74) *Attorney, Agent, or Firm* — Blakely, Sokoloff, Taylor & Zafman LLP (57) ABSTRACT

According to one embodiment, a display device includes a base, a display module, and an connection portion. The display module includes a display screen that stands upright. The connection portion includes an extending portion that extends above the base. The connection portion is connected to the display module and is supported by the base to be rotatable about a rotation axis that extends vertically. The rotation axis is located on the display screen side with respect to the center axis of the extending portion extending along the vertical direction.

9 Claims, 11 Drawing Sheets

DISPLAY DEVICE AND ELECTRONIC DEVICE

CROSS-REFERENCE TO RELATED APPLICATIONS

This application is based upon and claims the benefit of priority from Japanese Patent Application No. 2010-244530, filed on Oct. 29, 2010, the entire contents of which are incorporated herein by reference.

FIELD

Embodiments described herein relate generally to a display device and an electronic device.

BACKGROUND

There have been known display devices provided with a swivel mechanism in which a display module having a display screen is supported by the base via a support column to be rotatable about a vertical rotation axis.

This type of electronic device or electronic device has a structure in which the center axis of the support column corresponds to the rotation axis of the swivel mechanism. In this structure, the position of the rotation axis is determined according to, for example, component layout, the layout of the support column that is set on the grounds of rigidity, strength, aesthetic aspect, and the like. As a result, it may be difficult to achieve both the support function and the swivel function together at a high level.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a display device comprises a base, a display module, and an connection portion. The display module comprises a display screen that stands upright. The connection portion comprises an extending portion that extends above the base. The connection portion is connected to the display module and is supported by the base to be rotatable about a rotation axis that extends vertically. The rotation axis is located on the display screen side with respect to the center axis of the extending portion extending along the vertical direction.

Exemplary embodiments will be described in detail below with reference to the accompanying drawings.

Figure 1:
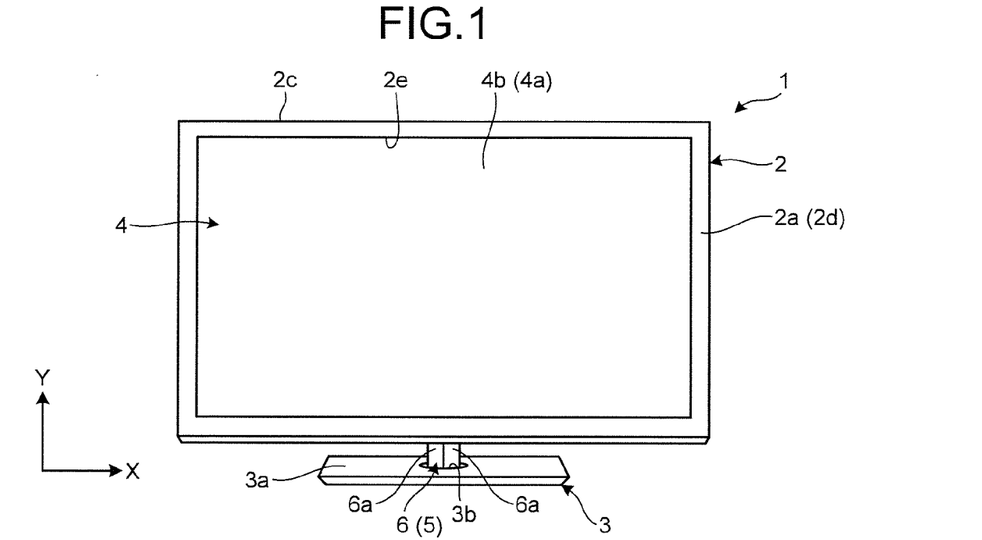
FIG. 1 is an exemplary perspective view of a display device as an electronic device viewed from the front according to an embodiment.
Figure 2:
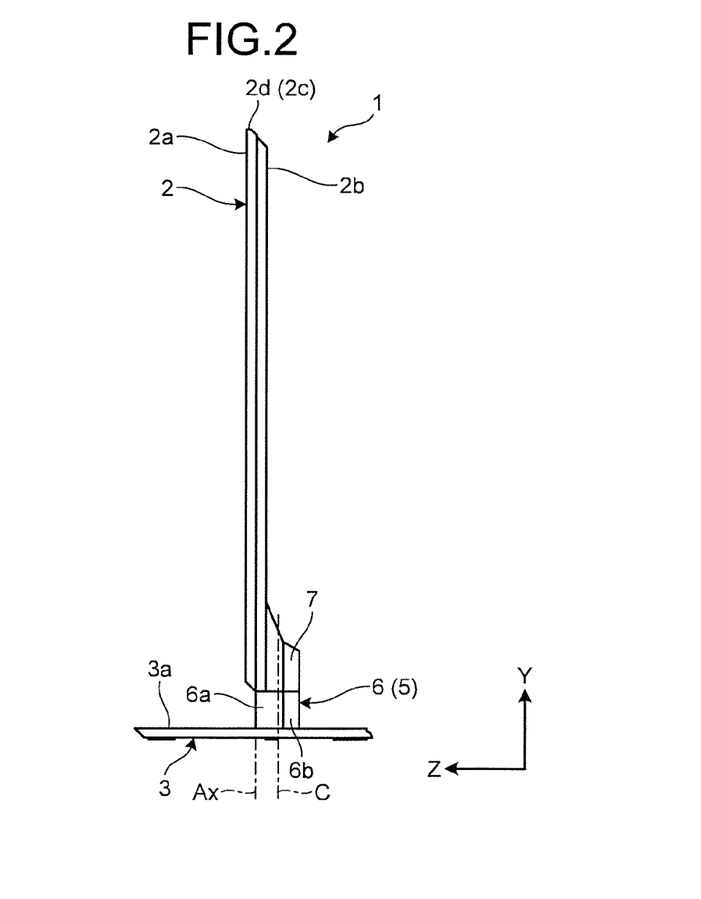
FIG. 2 is an exemplary side view of the display device in the embodiment.
Figure 3:
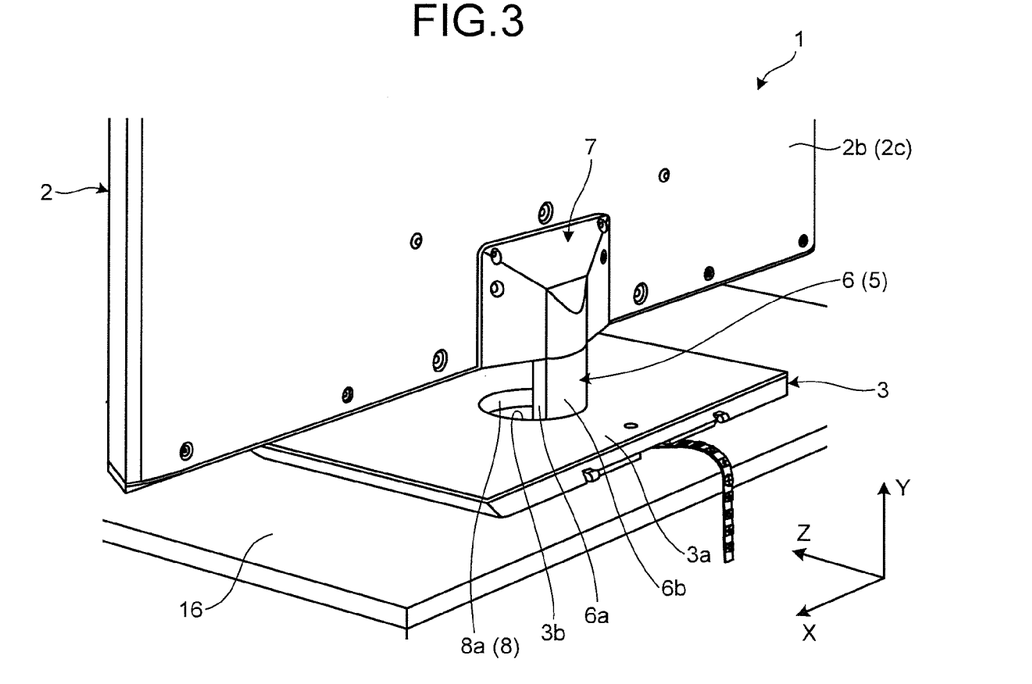
FIG. 3 is an exemplary perspective view of the display device viewed from the back in the embodiment.

As illustrated in FIGS. 1 to 3, a display device 1 of an embodiment comprises a base 3, a display module 2, and a connection portion 5. The base 3 is placed on a desk or the like. The display module 2 comprises a built-in display unit 4 such as a liquid crystal display (LCD). The connection portion 5 is connected to the display module 2 and supported by the base 3 to be rotatable about a rotation axis Ax. For the sake of convenience of description, in the state where the display module 2 of the display device is located in the center of the movable range, for example, the right direction in the front view of the display module 2 (the left direction in the back view) will be referred to as "X direction", the upper direction will be referred to as "Y direction", and the depth direction (the anterior direction) will be referred to as "Z direction". Arrows in each drawing indicate these directions in the state where the display module 2 is assembled with the display device 1.

Figure 5:
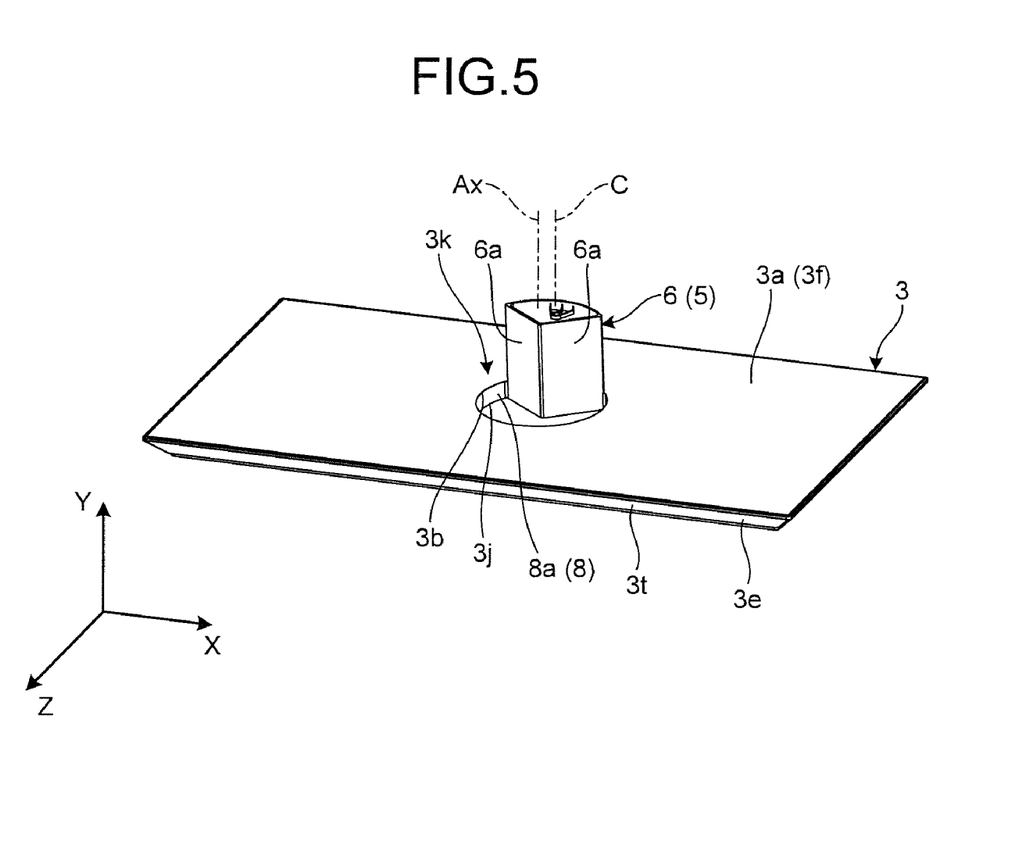
FIG. 5 is an exemplary perspective view of the external appearance of the base and the connection portion of the display device in the embodiment.

In the plan view, as illustrated in FIGS. 1 and 5, the base 3 has a flat rectangular shape relatively thin in the vertical direction. An upper surface 3a of the base 3 is provided with a through hole 3b having an opening at least part of which is in an arc shape. The through hole 3b of the embodiment is formed in a circular shape. From the through hole 3b (the opening), an extending portion 6 of the connection portion 5 extends above the base 3 and is exposed. Thus, the extending portion 6 corresponds to an exposed portion.

As illustrated in FIGS. 1 and 2, the display module 2 comprises a front surface 2a and a back surface 2b on the opposite side of the front surface 2a. The display module 2 is formed in a flat cuboid shape and is thin in the front-back direction. In the front view, the display module 2 has a horizontally long rectangular appearance. A front mask 2d is part of a housing 2c that covers a front surface 4a of the display unit 4, and is provided with a rectangular opening 2e. The front surface 4a of the display unit 4 is exposed from the opening 2e. In the embodiment, part of the front surface 4a of the display unit 4 exposed from the opening 2e corresponds to a display screen 4b. As can be seen from FIGS. 1 and 2, the display screen 4b stands upright.

In addition to the display unit 4, the housing 2c of the display module 2 houses therein a circuit board having electronic components such as a central processing unit (CPU) mounted thereon, other electronic components, and the like (all not illustrated). The display unit 4 receives a video signal from a video signal processing circuit (not illustrated), which is one of control circuits (not illustrated) formed of the electronic components mounted on the circuit board. Then, the display unit 4 displays video including still images and moving images on the display screen 4b. Assuming that if the display device 1 is a television, apart from the video signal processing circuit, the control circuits of the display device 1 include, for example, a tuner, a high-definition multimedia interface (HDMI) signal processor, an audio-video (AV) input terminal, a remote control signal receiver, a controller, a selector, an on-screen display interface, a memory such as a read only memory (ROM), a random access memory (RAM), and a hard disk drive (HDD), an audio signal processing circuit, and the like (all not illustrated). The circuit board is located behind (on the back side of) the display unit 4 in the housing 2c. Assuming that if the display device 1 is a computer, the control circuits of the display device 1 include, for example, a controller such as CPU, a memory such as ROM, RAM, and HDD, a display driver, a communication interface, and the like. The display device 1 further comprises a built-in amplifier, a speaker, and the like (not illustrated) for audio output.

Figure 4:
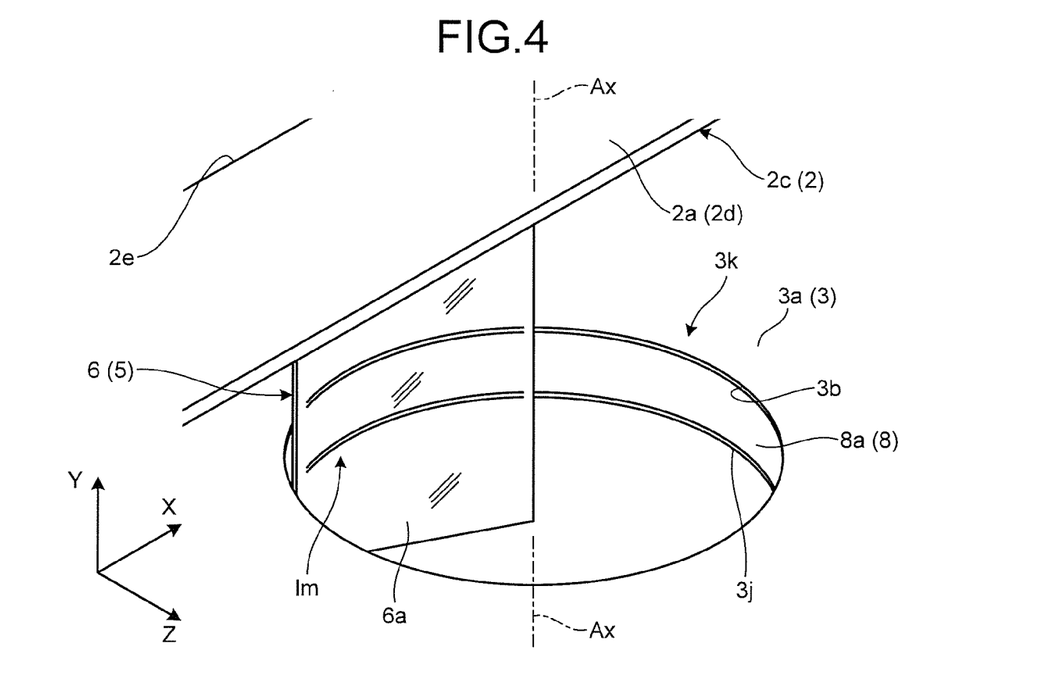
FIG. 4 is an exemplary perspective view of a connection portion of the display device viewed from the front in the embodiment.

As illustrated in FIG. 3, the extending portion 6 that is part of the connection portion 5 is connected to a lower portion of the back surface of the display module 2 via a bracket 7 by screwing or the like. The connection portion 5 further comprises a disk-like or ring-like (in the embodiment, for example, ring-like) held portion 8 that is held between an upper member 3c and a lower member 3d of the base 3 (see FIGS. 6, 8, and 9). The held portion 8 (i.e., the connection portion 5) is supported by the base 3 to be rotatable about the vertical rotation axis Ax. The edge of the through hole 3b forms a circle with the rotation axis Ax as the center. An inner circumferential surface 8a of the held portion 8 is the inner circumferential surface of a cylinder with the rotation axis Ax as the center. The diameter of the through hole 3b is about the same as that of the inner circumferential surface 8a. The extending portion 6 is connected to part of the inner circumferential side of the held portion 8. As illustrated in FIGS. 3 to 5, the extending portion 6 comprises two front surfaces 6a and a back surface 6b. The front surfaces 6a are part of two different planes containing the rotation axis Ax, respectively. The back surface 6b corresponds to the outer circumferential surface of a cylinder with the rotation axis Ax as the center. In the embodiment, for example, the two front surfaces 6a are perpendicular to each other. Accordingly, the extending portion 6 has a fan-shaped cross section with a center angle of 90°. The front surfaces 6a are formed as mirror surfaces that reflect visible light. With this structure, as illustrated in FIG. 4, reflection Im of the through hole 3b, the upper surface 3a, the inner circumferential surface 8a, and the like is formed in the front surfaces 6a as mirror surfaces. The reflection Im is visually combined with the real through hole 3b and the inner circumferential surface 8a, thereby forming a rotating body such as a continuous circle or cylinder. That is, according to the embodiment, an illusion is created as if the extending portion 6 (the connection portion 5) does not exist and the display module 2 is floating or the extending portion 6 is made of a transparent material. The reflection Im can be obtained by forming the front surfaces 6a as mirror surfaces (reflecting surfaces) corresponding to part of planes containing the rotation axis Ax as well as forming the through hole 3b and the inner circumferential surface 8a as a rotating body with the rotation axis Ax as the center. In other words, the inner circumferential surface 8a need not necessarily be the inner circumferential surface of the cylinder and is only required to be part of the rotating body with the rotation axis Ax as the center. Further, the front surfaces 6a need not necessarily be perpendicular to each other. Besides, the front surfaces 6a may be replaced with a single planar front surface (mirror surface) containing the rotation axis Ax with the same effect.

According to the embodiment, the front surfaces 6a as mirror surfaces extend downward from the through hole 3b. Accordingly, the lower portion of the base 3 as well as the upper portion are refracted in the front surfaces 6a. As a result, the range of the reflection Im increases downward, and profiles of objects and the like increase in the reflection Im. Thus, the illusion is more easily created.

According to the embodiment, the extending portion 6 (the connection portion 5) is movably connected to the base 3. More specifically, the extending portion 6 is located on the inner circumference side of the arc of the through hole 3b as the opening. The extending portion 6 rotates along the arc-shaped edge of the through hole 3b about the rotation axis Ax. This structure allows the angle of the display screen 4b of the display module 2 to be variable. Besides, regardless of the rotating position of the extending portion 6 (the connection portion 5), the visual effect (illusion) as described above can be created.

Figure 6:
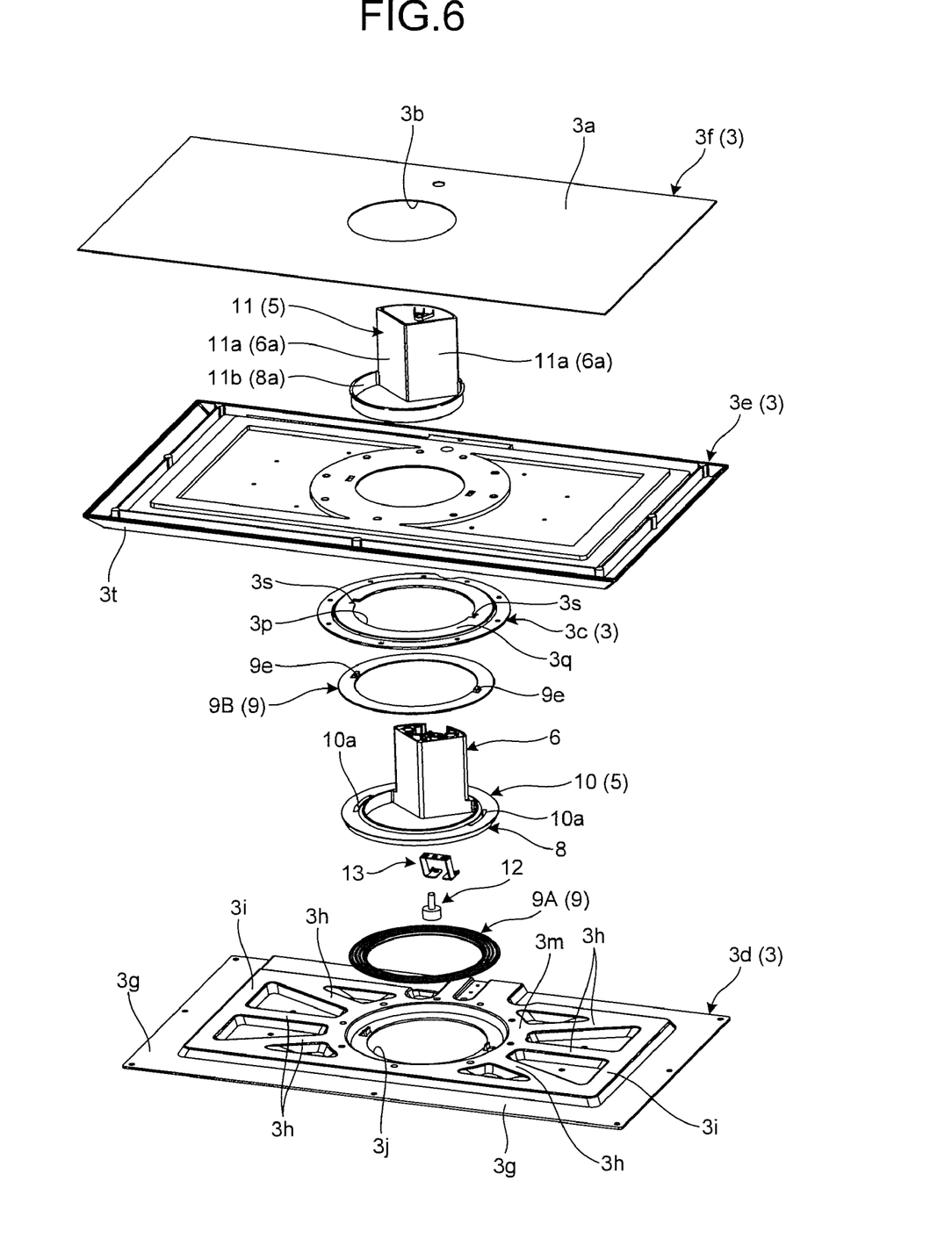
FIG. 6 is an exemplary exploded perspective view of the base and the connection portion of the display device in the embodiment.

As illustrated in FIG. 6, the base 3 comprises the upper member 3c and the lower member 3d as a main body, a side cover 3e, and a top cover 3f. The upper member 3c and the lower member 3d are made of relatively high rigid material such as, for example, metal material. The side cover 3e mainly covers the side, while the top cover 3f mainly covers the top.

Figure 7:
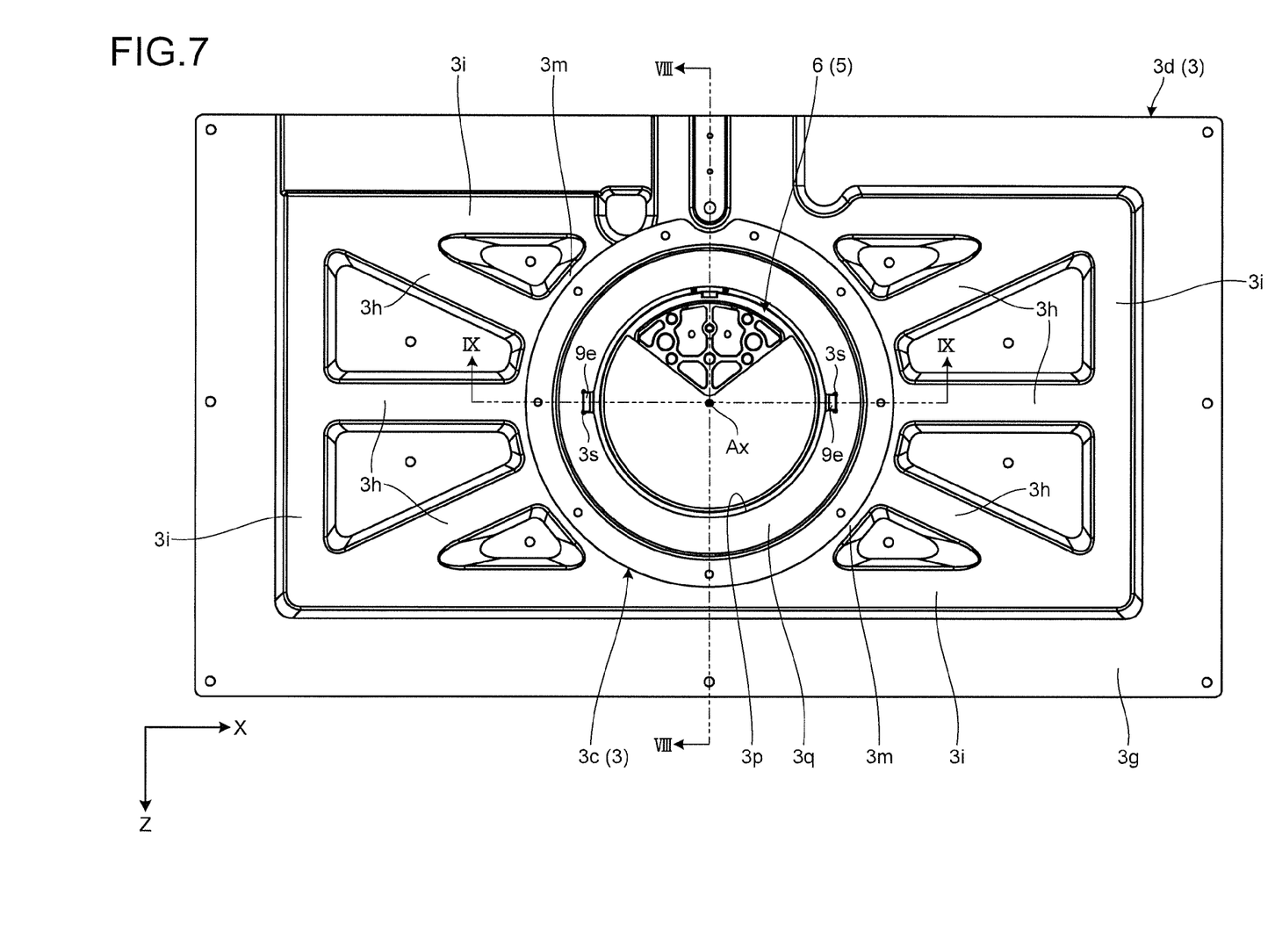
FIG. 7 is an exemplary plan view of the base and the connection portion of the display device without a top cover in the embodiment.

As illustrated in FIGS. 6 and 7, the lower member 3d comprises a rectangular bottom plate 3g and ridge-like frames 3h and 3i that extend upward from the bottom plate 3g. Provided in the center of the lower member 3d is a circular through hole 3j that vertically overlaps the through hole 3b provided to the upper member 3c with the rotation axis Ax as the center. The base 3 is provided with a through hole 3k (see FIGS. 4 and 5) that extends vertically through the inside of the cylinder of the held portion 8. That is, the upper edge of the through hole 3k corresponds to the through hole 3b (upper opening), while the lower edge corresponds to the through hole 3j (lower opening). Further, the middle of the through hole 3k corresponds to the inside of the cylinder of the held portion 8, and the center axis corresponds to the rotation axis Ax. A ring-like top plate 3m is provided around the through hole 3j. The plurality of frames 3h extend radially from the top plate 3m and are connected to the rectangular frame 3i.

Figure 8:
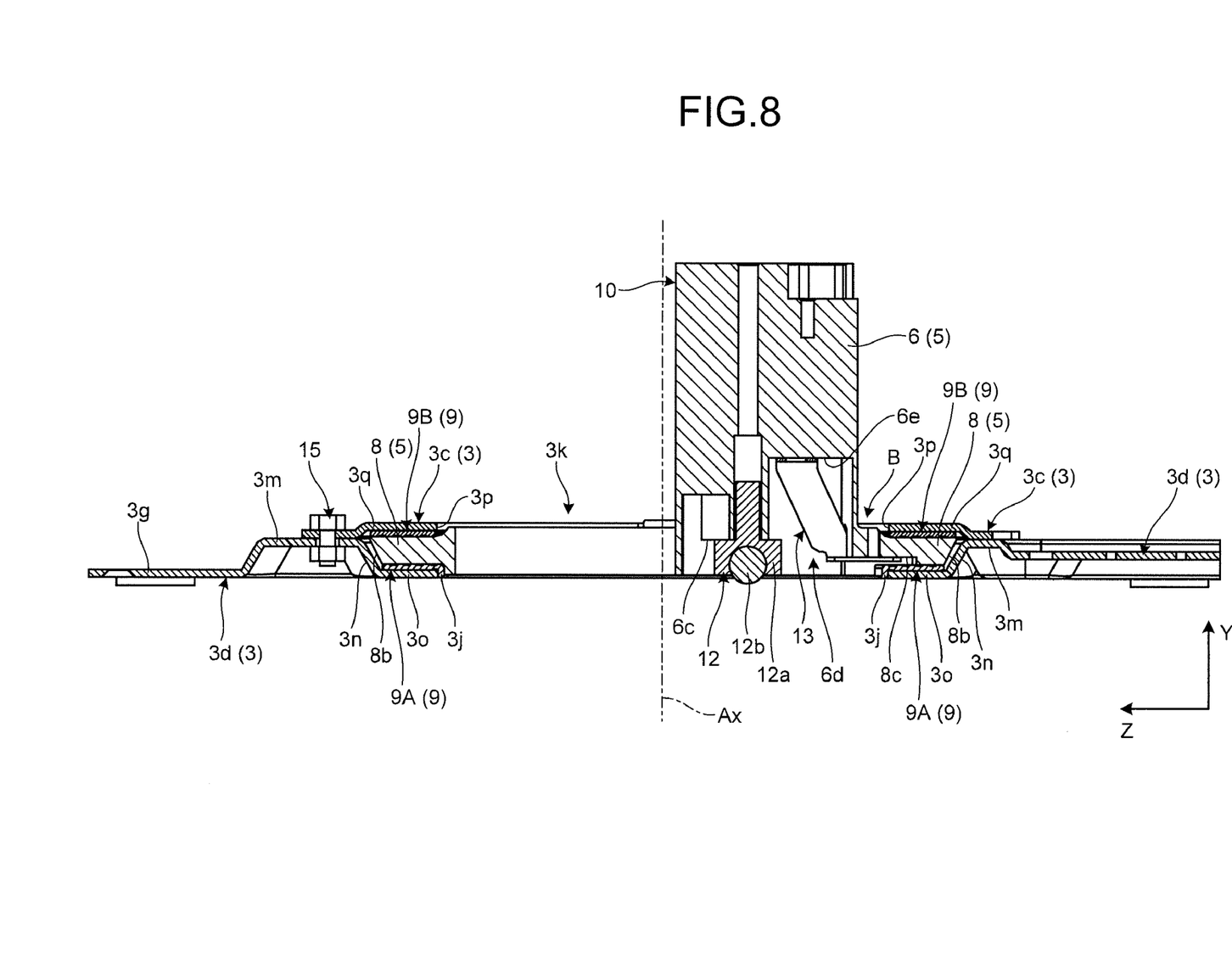
FIG. 8 is an exemplary cross-sectional view taken along line VIII-VIII of FIG. 7 in the embodiment.
Figure 9:
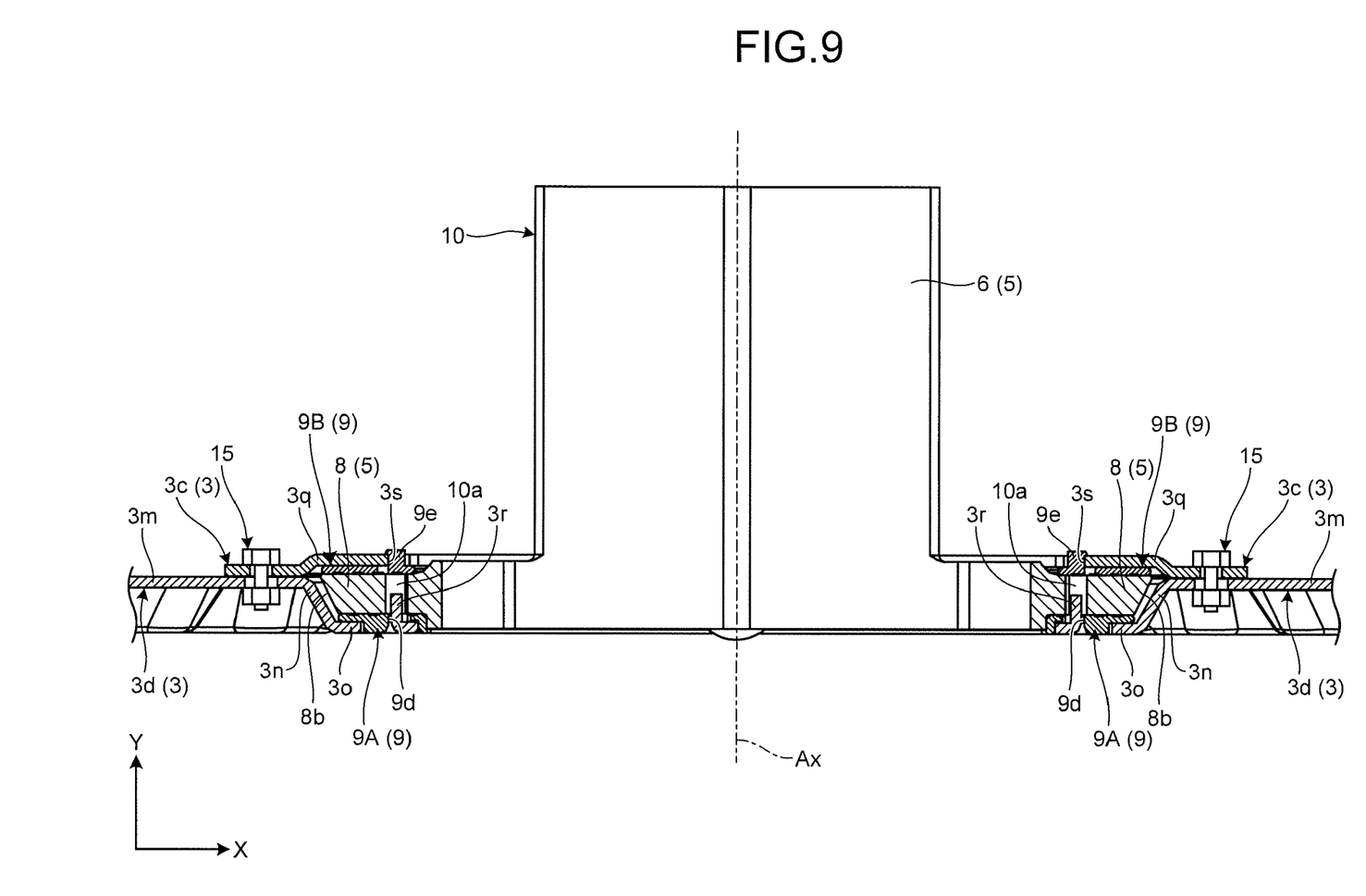
FIG. 9 is an exemplary cross-sectional view taken along line IX-IX of FIG. 7 in the embodiment.

As illustrated in FIGS. 8 and 9, the lower member 3d is provided with a cylindrical vertical wall 3n and a ring-like and plate-like flange 3o inside the top plate 3m. The vertical wall 3n tapers downward. The flange 3o extends inward from the lower end of the vertical wall 3n by a constant width. As illustrated in FIGS. 8 and 9, the held portion 8 of the connection portion 5 is located on the flange 3o. The lower member 3d may be formed by press molding or the like.

As illustrated in FIGS. 6 and 7, the upper member 3c is formed in a ring-like and plate-like shape. The upper member 3c is also provided with a through hole 3p with the rotation axis Ax as the center. A portion surrounding the through hole 3p bulges upward. The bulge is relatively low in height and constant in width. A ring-like and plate-like flange 3q extends inward from the portion by a constant width. As illustrated in FIGS. 8 and 9, the held portion 8 of the connection portion 5 is located below the flange 3q. The upper member 3c may also be formed by press molding or the like.

As illustrated in FIGS. 8 and 9, the held portion 8 of the connection portion 5 is located between the flange 3q of the upper member 3c and the flange 3o of the lower member 3d in the vertical direction (the Y direction). A ring-like and plate-like slidable contact plates 9 are interposed between the held portion 8 and the upper member 3c and between the held portion 8 and the lower member 3d, respectively. In this manner, according to the embodiment, a rotation support mechanism to rotatably support the display module 2 can be made relatively thin.

As illustrated in FIGS. 8 and 9, an outer circumferential surface 8b of the held portion 8 tapers downward and faces the vertical wall 3n with a space therebetween. The vertical wall 3n prevents the held portion 8 (the connection portion 5) from being displaced horizontally and also receives a load acting from up to down due to the mass of the display module 2 or the like.

Figure 10:
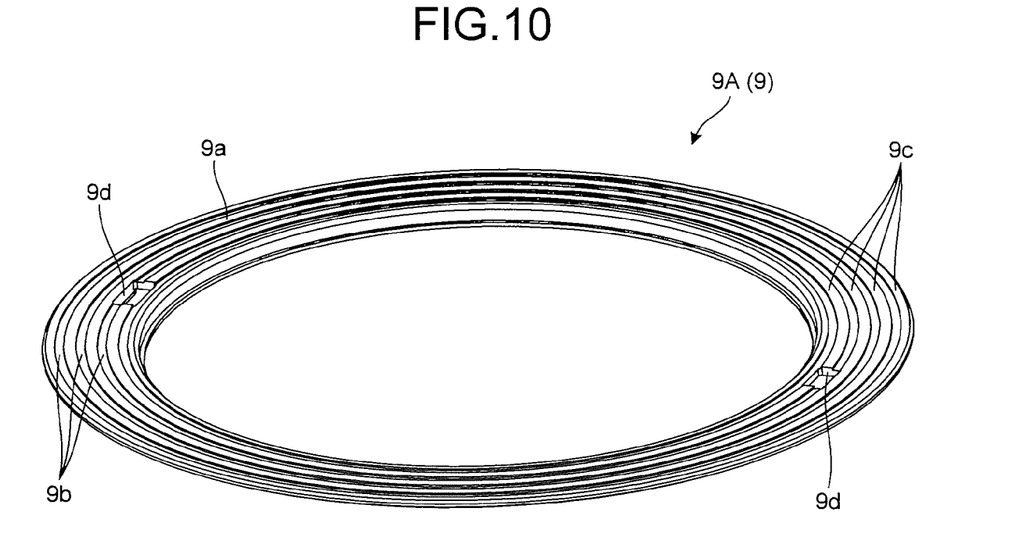
FIG. 10 is an exemplary perspective view of a slidable contact ring of the display device in the embodiment.

A slidable contact surface 9a of the slidable contact plate 9 (9A) is provided with either or both a groove 9b and a rib 9c (both in the embodiment) along the circumferential direction as illustrated in FIG. 10. The groove 9b functions as a grease holder when grease is applied and facilitates to maintain the lubrication. The slidable contact plate 9 is made of a synthetic resin material having relatively high slidability or the like. Although FIG. 10 illustrates only the lower slidable contact plate 9A, with respect to the groove 9b and the rib 9c, the upper slidable contact plate 9B has the same structure as described above. The slidable contact plate 9B is provided with either or both the groove 9b and the rib 9c on the lower surface.

As illustrated in FIG. 10, the lower slidable contact plate 9A is provided with a through hole 9d. By a protrusion 3r of the lower member 3d passing through the through hole 9d as illustrated in FIG. 9, the slidable contact plate 9A is engaged with the lower member 3d.

On the other hand, as illustrated in FIGS. 6, 7, and 9, the upper slidable contact plate 9B is provided with a protrusion 9e protruding upward. The protrusion 9e is inserted in a notch 3s provided to the upper member 3c, which engages the slidable contact plate 9B with the upper member 3c.

In the embodiment, a space between the lower surface of the flange 3q and the upper surface of the flange 3o is set smaller than the total thickness of the held portion 8 and the two slidable contact plates 9. Accordingly, when the upper member 3c and the lower member 3d are fastened together by a fastener member 15 (see FIGS. 8 and 9) or the like, the end of the rib 9c on the slidable contact plate 9 is flattened. That is, with the rib 9c, the slidable contact plate 9 is easily flattened compared to the case where the slidable contact plate 9 has a flat upper or lower surface. This facilitates to absorb manufacturing variations (differences or errors).

The side cover 3e and the top cover 3f illustrated in FIGS. 5 and 6 are both made of a relatively light material such as, for example, synthetic resin. To achieve a predetermined rigidity and strength, the side cover 3e is provided with a convexo-concave shape as required. A side surface 3t of the side cover 3e and the upper surface 3a of the top cover 3f correspond to exposed surfaces (outer surfaces, design surfaces) of the base 3.

As illustrated in FIG. 6, the connection portion 5 comprises a main body 10 and a cover 11 that covers the main body 10. The main body 10 is made of relatively high rigid metal material such as, for example, aluminum alloy or the like. The cover 11 is made of a relatively light material such as synthetic resin. Part of an outer surface 11a of the cover 11 corresponds to an exposed surface (outer surface, design surface). The front surfaces 6a of the extending portion 6 formed as mirror surfaces are also part of the outer surface 11a of the cover 11. In the embodiment, an inner circumferential surface 11b corresponding to the inner circumferential surface 8a of the held portion 8 is also formed as a mirror surface. The mirror surfaces of the front surfaces 6a and the inner circumferential surface 11b may be formed by evaporation coating, applying a thin layer or film of metal material, or the like. The cover 11 is preferably fixed to the main body 10 by a screw or the like so that it does not come off the main body 10 when the user holds the cover 11.

Figure 11:
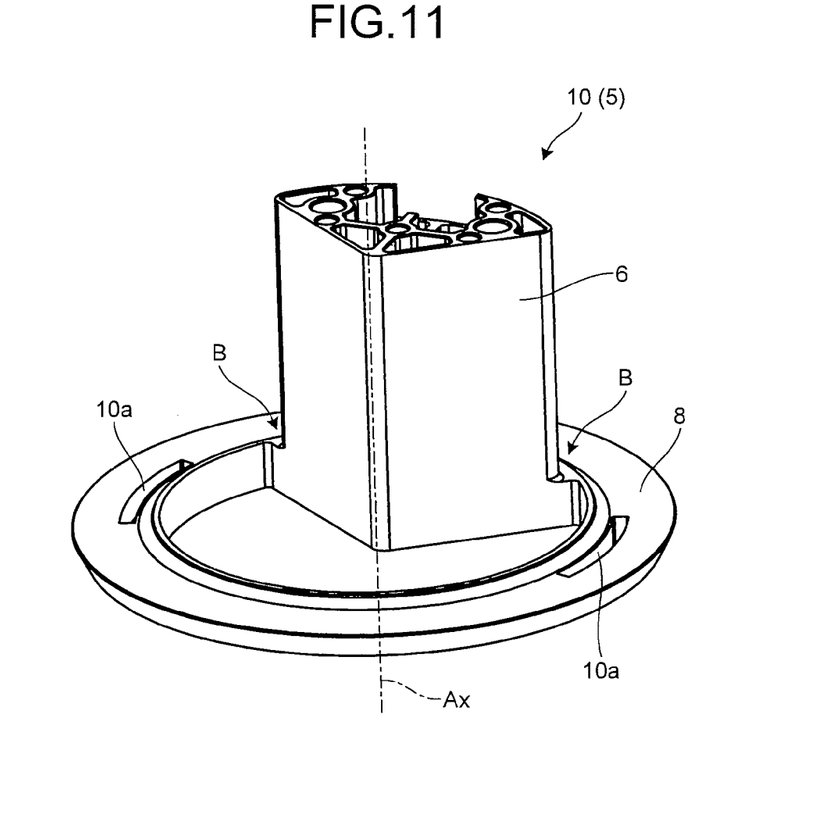
FIG. 11 is an exemplary perspective view of the main body of the connection portion of the display device in the embodiment.

As illustrated in FIG. 11, the held portion 8 of the main body 10 (the connection portion 5) is provided with a slit 10a that forms an arc of constant width around the rotation axis Ax as the center. As illustrated in FIG. 9, inserted in the slit 10a is the protrusion 3r used to engage the lower slidable contact plate 9A with the lower member 3d. With respect to the rotation of the connection portion 5 about the rotation axis Ax, the protrusion 3r functions as a slider, while the slit 10a functions as a rail. That is, in the embodiment, the protrusion 3r and the slit 10a guide the connection portion 5 to come around the rotation axis Ax, and form a guide mechanism that determines the rotation range of the connection portion 5.

Figure 12A:
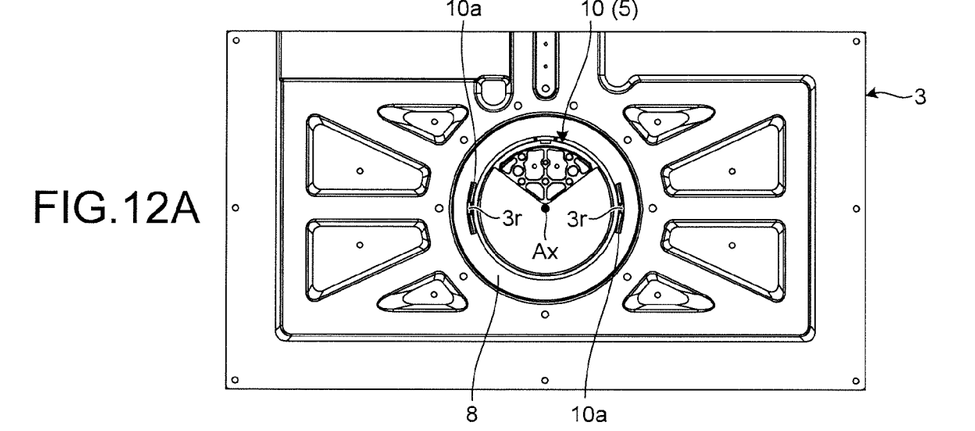
FIG. 12A is an exemplary plan view of the base and the connection portion, which is located in the center of a rotation range, of the display device without the top cover and an upper member in the embodiment.
Figure 12B:
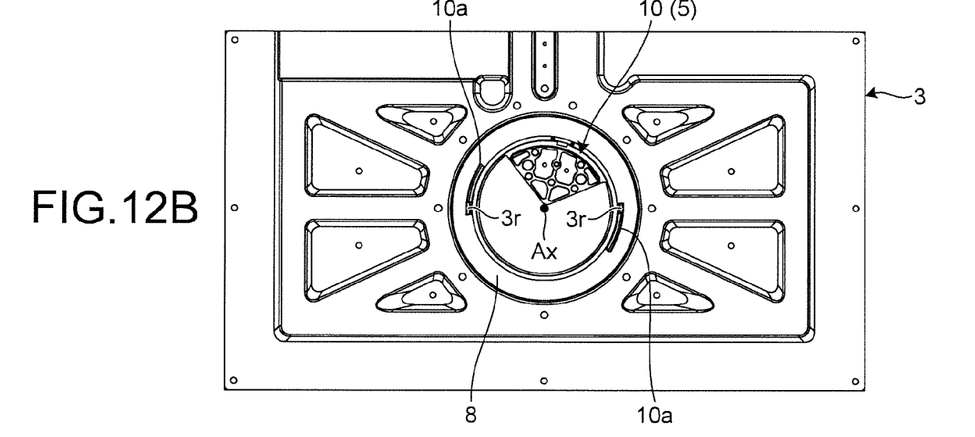
FIG. 12B is an exemplary plan view of the base and the connection portion, which is located at an edge of the rotation range, of the display device without the top cover and an upper member in the embodiment.
Figure 12C:
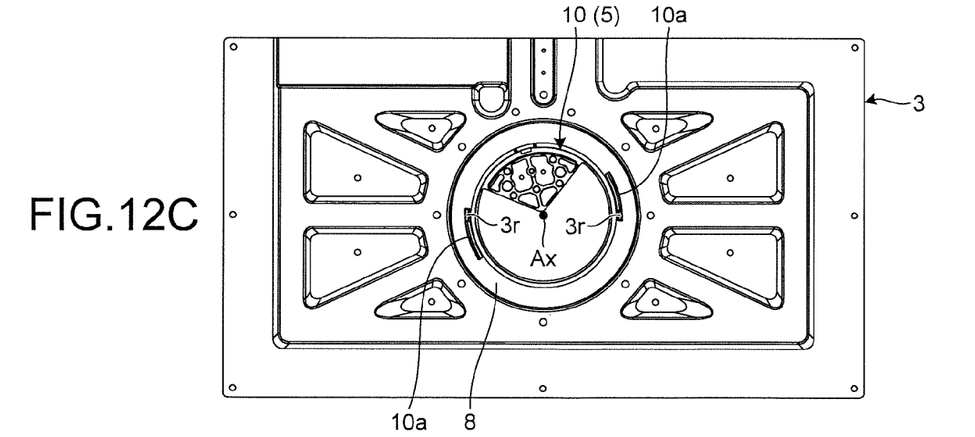
FIG. 12C is an exemplary plan view of the base and the connection portion, which is located at another edge of the rotation range, of the display device without the top cover and an upper member in the embodiment.

With this, as illustrated in FIGS. 12A, 12B, and 12C, the connection portion 5 rotates about the rotation axis Ax with respect to the base 3. FIG. 12A illustrates the connection portion 5 which is located in the center of the rotation range. FIG. 12B illustrates the connection portion 5 which is located at an edge of the rotation range in the clockwise direction. FIG. 12C illustrates the connection portion 5 which is located at an edge of the rotation range in the counterclockwise direction. As the protrusion 3r is locked at the end of the slit 10a in the circumferential direction, the rotation range of the connection portion 5 is regulated.

With the structure as described above in the embodiment, as illustrated in FIG. 2, the rotation axis Ax and the center axis C of the extending portion 6 can be shifted relative to each other. This increases the degree of freedom in design and thereby facilitates to improve the aesthetic quality. Besides, the position of the rotation center, the rotating posture, and the like of the display screen 4b can be determined regardless of the position of the extending portion 6. For example, the center of the display screen 4b can be set as the rotation axis Ax.

Figure 13:
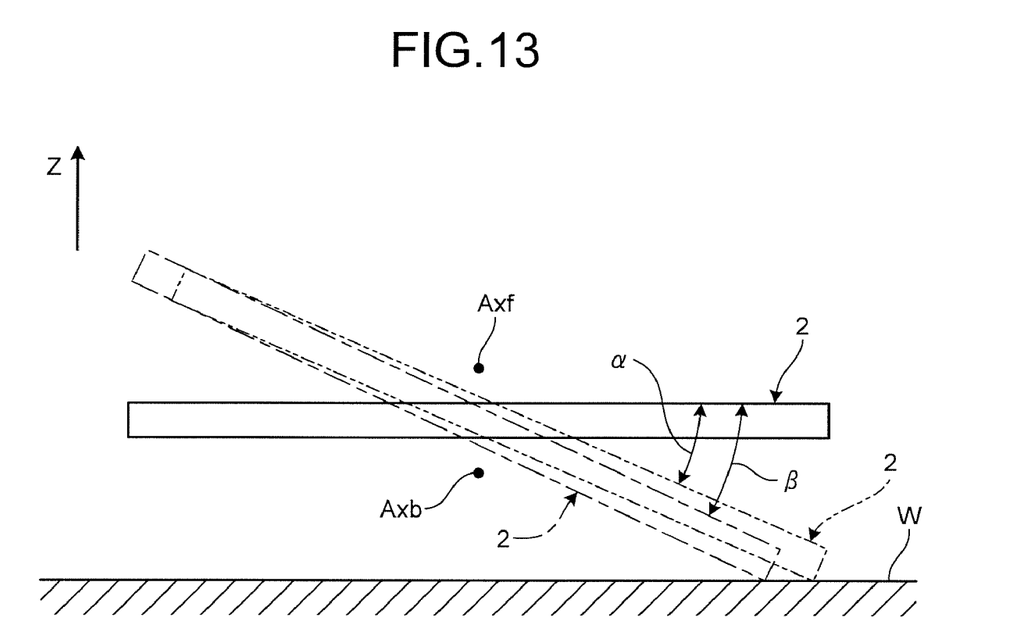
FIG. 13 is an exemplary schematic plan view of the rotation range of a display module of the display device in the embodiment.

As in conventional technologies, if the vertical center axis C of the extending portion 6 (the axis passing through the gravity center of the extending portion 6) matches the rotation axis, since the extending portion 6 is connected to the display module 2 on the back side of the display screen 4b, the rotation axis is likely to be located on the back side. In a structure as illustrated in FIG. 13 in which the display module 2 rotates about a back rotation axis Axb, if an obstacle such as, for example, a wall W exists on the back, the rotation range (−α to +α) is relatively small as indicated by an alternate long and two short dashes line (the minus side is not illustrated).

On the other hand, in a structure in which the display module 2 rotates about a front rotation axis Axf, the rotation range ($-\beta$ to $+\beta$, $\beta>\alpha$) is relatively large as indicated by an alternate long and short dash line (the minus side is not illustrated). According to the embodiment, as illustrated in FIG. 2, the rotation axis Axis located in front of the center axis C of the extending portion 6. Thus, the rotation range can be easily increased compared to the case where the rotation axis is located in the center of the extending portion 6. This structure corresponds to a structure in which the rotation axis Ax is located in the front portion of the extending portion 6 (on the display screen 4b side, including the front surfaces 6a) or in front of the extending portion 6 (in the direction in which the display screen 4b faces, the normal direction, the Z direction).

If a mechanism to rotatably support the display module 2 is built in the extending portion 6, the extending portion 6 is likely to be large, which degrades the aesthetic quality. In view of this, according to the embodiment, the base 3 is provided with a rotation support mechanism for the connection portion 5 that comprises the flanges 3o and 3q as holders, the slidable contact plate 9, the held portion 8, and the like. The extending portion 6 (exposed portion) rotates together with the display module 2. Thus, the extending portion 6 can be formed small within a range in which the rigidity and strength required to support the display module 2 can be obtained.

As can be seen from FIGS. 8 and 11, according to the embodiment, the extending portion 6 extends toward the inner diameter side as being supported on one side, i.e., the outer diameter side, by the held portion 8. Accordingly, on the boundary B between the held portion 8 and the extending portion 6, the stress tends to be high due to the gravity acting on the display module 2.

Figure 14A:
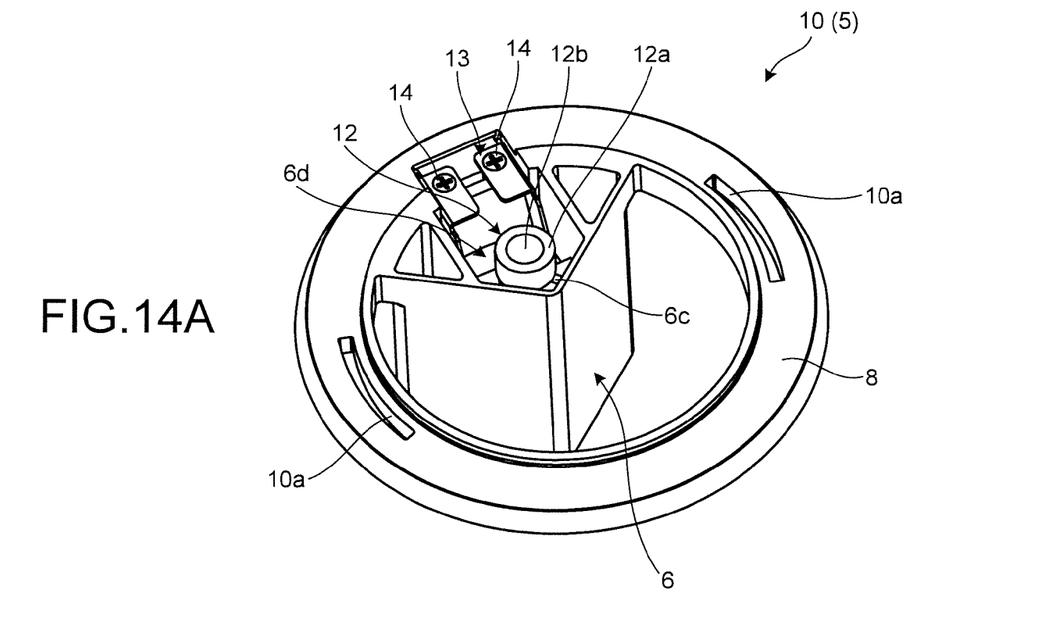
FIG. 14A is an exemplary perspective view of the connection portion of the display device viewed from below in the embodiment.
Figure 14B:
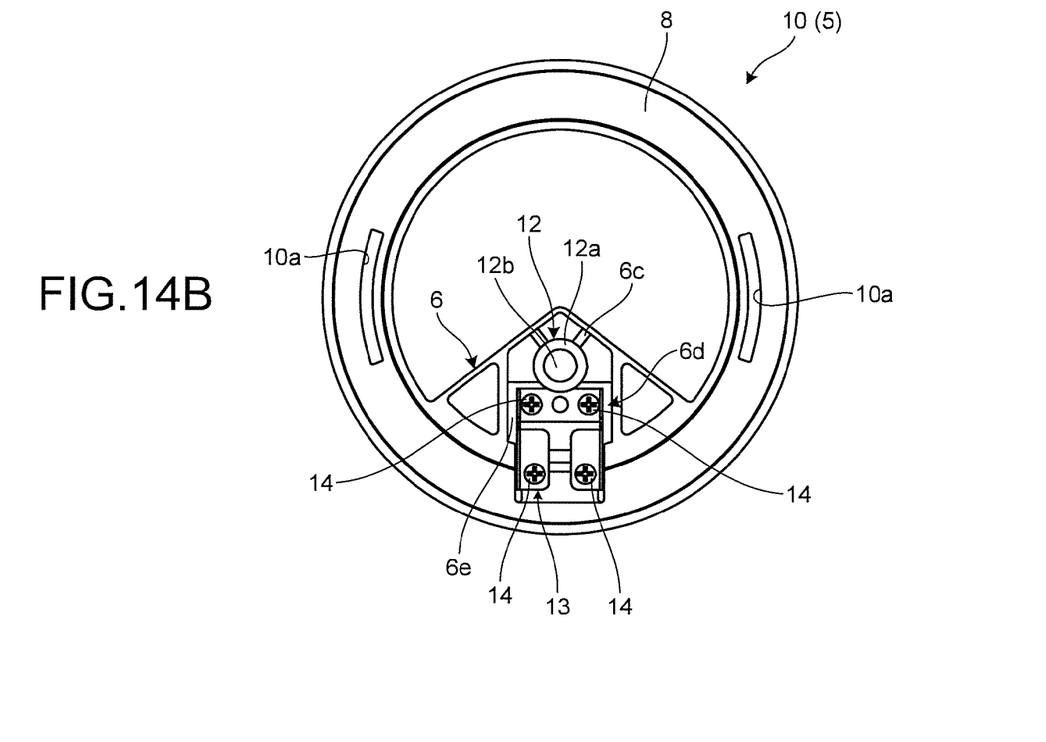
FIG. 14B is an exemplary plan view of the connection portion of the display device viewed from below in the embodiment.

In view of this, according to the embodiment, as illustrated in FIGS. 8, 14A, and 14B, a supported portion 12 at which the extending portion 6 is supported is provided on a lower surface 6c of the extending portion 6. The supported portion 12 comprises a base portion 12a and a roller 12b. The base portion 12a is attached to the lower portion of the extending portion 6 by screwing or the like. The roller 12b is rotatably supported by the base portion 12a to be exposed at least downward from the base portion 12a. The roller 12b may be, for example, a ball, a needle, or the like. In the embodiment, the extending portion 6 is supported by a table 16 (see FIG. 3) at the supported portion 12. Accordingly, the stress generated at the boundary B is likely to be small. Moreover, because of the roller 12b of the supported portion 12, it is possible to reduce resistance by the supported portion 12 to the rotation of the connection portion 5. Incidentally, elastic material such as elastomer (not illustrated) may be interposed between the supported portion 12 and the extending portion 6 (the connection portion 5) as a buffer or a cushion, or a member to absorb the dimension error.

According to the embodiment, as illustrated in FIGS. 8, 14A, and 14B, there is provided a bridge 13 having one end connected to the held portion 8 and the other end connected to the extending portion 6 and crossing the boundary 13. For example, the bridge 13 is formed as a metal plate. The bridge 13 is fixed to a lower surface 8c of the held portion 8 and a bottom surface 6e of a recess 6d having an opening downward provided to the extending portion 6 by screws or the like. As illustrated in FIG. 8, the bridge 13 extends forward (in the Z direction) and upward (in the Y direction) from the held portion 8 side to the extending portion 6 side. The bridge 13 has a predetermined rigidity and strength, and can function as a reinforcing member. Besides, if the connection portion 5 is broken at the boundary B and the extending portion 6 and the held portion 8 are separated from each other, the bridge 13 functions as a fail-safe member that prevents the extending portion 6 from falling over. That is, if the connection portion 5 is broken at the boundary B in the structure in which the gravity center of the display module 2 is located forward from the boundary B, it is possible to prevent the display module 2 as well as the extending portion 6 from falling over forward.

The above embodiment is susceptible to several modifications and variations. For example, while the rotation axis is described above as being shifted forward from the center axis of the extending portion, it may be shifted in another direction. The supported portion need not necessarily be provided with the roller. Further, the opening on the upper surface of the base need not necessarily be circular, and may be in any shape at least partly arcuate.

While the above embodiment is described by way of example as being applied to a television, it may also be applicable to other electronic devices provided with a display screen, such as display devices for electronic devices, a personal computers, and the like.

Besides, regarding the electronic device, the display device, the base, the opening, the through hole, the display module, the extending portion, the exposed portion, connection portion, the two members (the upper member and the lower member), the held portion, the bridge, the supported portion, the roller, the slidable contact plate, the groove, the rib, the mirror surface, and the like, the specifications (structure, shape, material, size, length, width, thickness, height, number, arrangement, position, etc.) can be suitably modified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a base comprising:
        a first member to which a first through hole is provided; and
        a second member to which a second through hole overlapping the first through hole is provided, and positioned on an upper side of the first member;
    a display module comprising a display screen that stands upright; and
    a connection portion comprising:
        a held portion held between the first member and the second member so as to be able to rotate about a rotation axis that extends vertically, a third through hole overlapping the first through hole and the second through hole being provided to the held portion, the held portion being shaped in a ring with the rotation axis as a center; and
        an extending portion extending above the base through the second through hole, the connection portion being connected to the display module, wherein
    the rotation axis is located on a display screen side with respect to a center axis of the extending portion extending along a vertical direction.

2. The display device of claim 1, further comprising a bridge, one end of which is connected to the held portion, and another end of which is connected to the extending portion.

3. The display device of claim 1, further comprising a supported portion on a lower surface of the extending portion.

4. The display device of claim 3, wherein the supported portion comprises a rotatable roller that is exposed downward.

5. The display device of claim 1, further comprising a slidable contact plate that is located between the held portion and at least one of the upper member and the lower member, and that is in slidable contact with at least either the held portion or the one of the upper member and the lower member.

6. The display device of claim 5, further comprising a groove or a rib that is provided on a slidable contact surface of the slidable contact plate and extends along a circumferential direction.

7. The display device of claim 1, wherein
an inner surface on the inner diameter side of the held portion is formed as part of a rotating body with the rotation axis as a center and is exposed from the through hole, and
the extending portion comprises a minor surface corresponding to part of a plane containing the rotation axis.

8. A display device comprising:
a base comprising:
a first member to which a first through hole is provided; and
a second member to which a second through hole overlapping the first through hole is provided, and positioned on an upper side of the first member;
a display module comprising a display screen that stands upright; and
a connection portion comprising:
a held portion held between the first member and the second member so as to be able to rotate about a rotation axis that extends vertically, a third through hole overlapping the first through hole and the second through hole being provided to the held portion, the held portion being shaped in a ring with the rotation axis as a center; and
an exposed portion exposed above the base through the second through hole, the connection portion being connected to the display module, wherein
the exposed portion is exposed above the base in a manner in which the exposed portion is located towards one side in a radial direction of the rotation axis with respect to the rotation axis.

9. An electronic device comprising:
a base comprising:
a first member to which a first through hole is provided; and
a second member to which a second through hole overlapping the first through hole is provided, and positioned on an upper side of the first member;
a display module comprising a display screen that stands upright; and
a connection portion comprising:
a held portion held between the first member and the second member so as to be able to rotate about a rotation axis that extends vertically, a third through hole overlapping the first through hole and the second through hole being provided to the held portion, the held portion being shaped in a ring with the rotation axis as a center; and
an extending portion extending above the base through the second through hole, the connection portion being connected to the display module, wherein
the rotation axis is located on a display screen side with respect to a center axis of the extending portion extending along a vertical direction.

* * * * *